(12) United States Patent
Lelegard

(10) Patent No.: US 8,352,732 B2
(45) Date of Patent: Jan. 8, 2013

(54) TRANSMISSION METHOD FOR CONDITIONAL ACCESS CONTENT

(75) Inventor: Thierry Lelegard, Paris (FR)

(73) Assignee: Nagra France SAS, Paris (FR)

( * ) Notice: Subject to any disclaimer, the term of this patent is extended or adjusted under 35 U.S.C. 154(b) by 1068 days.

(21) Appl. No.: 11/638,515

(22) Filed: Dec. 14, 2006

(65) Prior Publication Data

US 2007/0143599 A1   Jun. 21, 2007

(30) Foreign Application Priority Data

Dec. 15, 2005   (EP) ..................... 05292700

(51) Int. Cl.
*H04L 29/00* (2006.01)
(52) U.S. Cl. ............. 713/160; 713/161; 709/236
(58) Field of Classification Search .............. 713/160, 713/201
See application file for complete search history.

(56) References Cited

U.S. PATENT DOCUMENTS

| | | | | |
|---|---|---|---|---|
| 5,706,348 A * | 1/1998 | Gray et al. | ................ | 713/160 |
| 7,239,634 B1 * | 7/2007 | Chakravorty | ................ | 370/392 |
| 7,362,860 B2 * | 4/2008 | Hayashi | ................ | 380/210 |
| 2002/0001386 A1 | 1/2002 | Akiyama | | |
| 2004/0052379 A1 | 3/2004 | Nishimoto et al. | | |
| 2004/0177251 A1 * | 9/2004 | Hayashi | ................ | 713/161 |

FOREIGN PATENT DOCUMENTS

| | | |
|---|---|---|
| EP | 1215905 | 5/2006 |
| WO | WO 03/105475 | 12/2003 |

OTHER PUBLICATIONS

European Search Report.

* cited by examiner

*Primary Examiner* — David Cervetti
*Assistant Examiner* — Ghazal Shehni
(74) *Attorney, Agent, or Firm* — Harness, Dickey & Pierce, P.L.C.

(57) ABSTRACT

This invention relates to a transmission method for conditional access content, in which said content is broadcast in the form of data packets (DP). These data packets contain at least one marker having a known value and a useful part (PL). This method includes the following steps:
  extraction of said marker (Mc) from the data packet (DP) and replacement of this marker with an encryption key identification information (PAR);
  encryption of said useful part (PL) by an encryption key (K1) that can be identified by said encryption key identification information (PAR);
  formation of an encrypted data packet containing at least said encryption key identification information (PAR) and the encrypted useful part (PLK1);
  transmission of said encrypted data packet to at least one receiver.

8 Claims, 1 Drawing Sheet

TRANSMISSION METHOD FOR CONDITIONAL ACCESS CONTENT

TECHNICAL FIELD

This invention relates to a transmission method for conditional access content from a content supplier, this content being sent to at least one receiver in the form of data packets.

It concerns also a method for processing conditional access content, in which said content is broadcast in the form of encrypted data packets.

These methods are applied in particular to Pay-TV, but also to other configurations in which the data is sent in an encrypted form. This data may in particular concern financial transactions, software, games or a musical content for example or data such as stock exchange data, weather forecasts or the like.

BACKGROUND ART

In a certain number of applications, in particular in the field of the Pay-TV, data forming a content is sent in the form of data packets. These packets can in particular have a fixed predefined length. They are generally broadcast in encrypted form to a set of receivers such as decoders.

In parallel to the data packets, decryption information is also broadcast or transmitted in another way. This information contains, in particular, the decryption keys or data allowing the necessary keys to be determined. In order to guarantee a certain level of security in conditional access data systems, it is imperative that the keys are changed after a certain usage or validity time. In practice, in the particular case of Pay-TV, a key could be used to access a television content for a few seconds, or even a few minutes. One of the constraints related to the key change is the need to associate the correct decryption key to each data packet, without which this data is not accessible. However, It is practically impossible to synchronise the data with the decryption information, in particular due to the internal working of the systems. Furthermore, in certain applications, the keys can be transmitted in the form of a key file completely independently of the content.

For these reasons, it is necessary to dispose of a mechanism that allows the association of each data packet to the corresponding decryption key, without being able to synchronise these two elements.

The document EP 1 215 905 describes such an application in which the keys are sent in the form of files independent of the content. In the process described in this document, the keys are sent in the form of a list. Parallel to this, a table is sent, this table containing for each key, the number of packets that have been encrypted with this key. The receiver includes a packet counter. When a packet is received, its content is decrypted with the first key of the key list. The number of packets encrypted with this key is searched for in the table. All the following packets received by the receiver are decrypted by the same key until the total number of packets encrypted with this key is reached. Then, the following key is used and the process continues in the same way.

According to another embodiment, in order to determine the key to be used for a given packet, an information contained in said packet is used, in particular a temporary piece of information contained in the header. The correspondence between the temporary information and the key to be used is stored in a table as mentioned previously.

In this method, the content of a packet is not modified. In addition to sending conventional information, a table allows the decryption key to be found which must be used in correspondence with each packet.

According to a known embodiment, the data packets generally contain a marker having a known value that allows the receiver/decoder to locate the start of a packet and process this packet accordingly.

According to the standards used to format these packets, the length of a packet is fixed and it is not possible to add supplementary data to that already existing. In particular, this means that when the encryption key of a packet is modified, provision is not made to indicate this key change in the packet, for example by means of key change information. It should be noted that the key change is not synchronised with the packets, so that a key can generally be used for encrypting and decrypting several packets.

In the existing systems, on reception of a packet, this is decrypted with the current key. Then it is verified if the result of the decryption is usable, that is to say if it contains the marker. If this is not the case, the same packet is decrypted with the following key. If the result of this decryption is usable and thus contains the marker, the new key is used for the decryption. If the result of this decryption does not contain the marker, an error message is generated.

This embodiment presents an important drawback. In fact, it happens that the decryption of a packet with the current key gives a result unmistakably containing the marker, even though this packet has been encrypted with a key other than the current key. This result given at random is produced according to a significant frequency and prevents a user from accessing the content even if he has the rights.

This invention proposes to avoid this drawback by carrying out a method in which the key change is indicated, so that the packets will be decrypted with the key with which they have been encrypted, without any possible confusion between the two keys. Therefore, access to the content is always assured.

DISCLOSURE OF THE INVENTION

The object of the invention is achieved by a transmission method for conditional access content, in which said content is broadcast in the form of data packets, these data packets containing at least one marker having a known value and a useful part, this method comprising the following steps:
  extraction of said marker from the data packet and replacement of this marker with an encryption key identification information;
  encryption of said useful part by an encryption key that can be identified by said encryption key identification information;
  formation of an encrypted data packet containing at least said encryption key identification information and the encrypted useful part;
  transmission of said encrypted data packet to at least one receiver.

The object of the invention is also achieved by a method for processing conditional access content, in which said content is broadcast in the form of encrypted data packets, this method comprising the following steps:
  reception of an encrypted data packet containing an encrypted useful part and at least an encryption key identification information;
  extraction of said encryption key identification information from said data packet;

determination of a key to be used for the decryption of said encrypted useful part, by means of the encryption key identification information;

decryption by means of the key to be used, of said encrypted useful part;

formation of a data packet by replacing, in the encrypted data packet, the encrypted useful part with the useful part and the encryption key identification information with a marker having a known value;

processing of said data packet.

In a Pay-TV system using the method of the invention, the data packets can be broadcast to a group of receivers, sent point-to-point or can be stored on a physical support such a hard disk, for example. The decryption data can also be broadcast, sent point-to-point or stored. In a very general way, the conditional access contents and the access means can be transmitted completely independently, possibly by different communication means.

Generally, the decryption device inside the receiver or the decoder simultaneously disposes of decrypting data or keys. In the case where more than two keys are stored in a memory of the decoder, they are transmitted to the decryption device in such a way that it also disposes of the two pieces of information at the same time, the others remaining stored for subsequent use. If this information is the decryption keys, it generally disposes of the present key and the following key, that is to say of the key having served to encrypt the packet being currently visualised and of the key having served to encrypt the next packet using a key different to the present key.

According to another embodiment, the decryption data or the keys can be stored in the form of a list, for example of the type of a crossing out list, or in the form of a file containing an index associated to the keys, thus allowing the key to be used to be found.

Although the data packet, through its structure and the constraints related to the standards used, does not allow the inclusion of key change information, the method of the invention allows the determination of the packet for which the following key must be used.

In fact, in the invention, as it is not possible to add supplementary information in relation to the content of a data packet, this existing information is replaced with other information related to the key change. This implies that the information can be eliminated without harming the normal working of the system, in particular without preventing access to the content.

This is possible thanks to the presence of the marker. In fact, as the value of this marker in clear is known, it is possible to eliminate it before encryption, in a management centre, then to add it after decrypting at the user's side. The elimination of this marker leaves a space available to insert information relating to the key changes.

In this invention, despite the impossibility of increasing the size of a data packet, supplementary information can be added that allows an ideal management of the key changes and which thus assures access to the encrypted content.

BRIEF DESCRIPTION OF THE DRAWINGS

This invention and its advantages will be better understood with reference to the enclosed drawings and to the detailed description of a particular embodiment, in which.

BEST MODE FOR CARRYING OUT THE INVENTION

Figure 1:
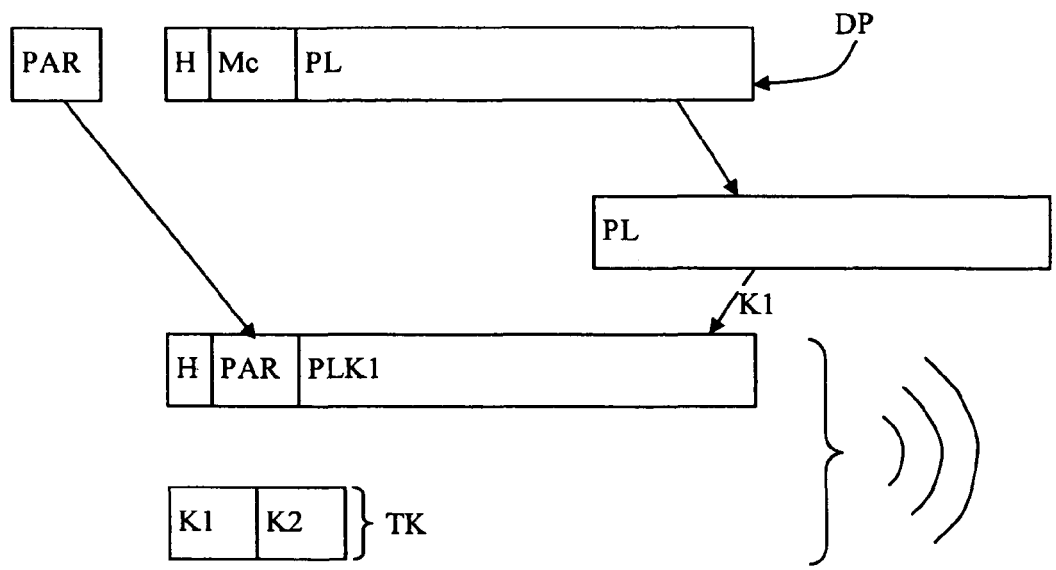
FIG. 1 schematically illustrates the encryption of a data packet according to the method of the invention.

With reference to FIG. 1, the broadcast content is transmitted in the form of data packets DP. Each data packet is formed of a header H in clear, of a marker Mc and of a useful part PL. The header H contains service information as well as a packet start indicator. According to one particular embodiment, it is made up of four bytes and the rest is always in plain text. The marker Mc is constant in all the packets. In practice, it is generally made up of three bytes in which the first two have the value 0 and the third has the value 1. The useful part PL is made up of actual conditional access data, that is to say audio or video data for example in the case of the diffusion of Pay-TV or music contents. The size of the complete data packet DP is fixed and should not be modified. In practice, it can for example be 188 bytes.

By applying the method of the invention for the encryption, in a first instance, the data packet DP is split into its components, namely the header H, the marker Mc and the useful part PL.

The useful part PL contained in the data packet is encrypted by means of a first encryption key K1, by using for example a block cipher algorithm, in order to obtain the encrypted useful part PLK1.

A new encrypted data packet is formed by associating the header H, the encryption key identification information PAR and the encrypted useful part PLK1. This identification information allows the identification of the key necessary to decrypt the encrypted useful part.

According to a first embodiment, the receiver or decoder always disposes of two keys. One of these is marked as having an even parity and the other an odd parity. In this case, the identification information PAR indicates simply if the key to be used is or odd or even.

It should be noted that the total length of a data packet must remain constant during the entire method. As the parity information replaces the marker, this information must have the same size, which can for example be three bytes.

The parity can be noted on only one bit, the others bits can be put at any value, for example all at 1 or all at 0 in order to reach the required size.

According to a second embodiment, in which the decoder disposes of more than two keys, the parity of the key cannot be used. If the keys are stored in the form of a list, the encryption key identification information PAR can be a number from this list.

According to a third embodiment, the keys are available in the form of an indexed file. In this case, the encryption key identification information PAR corresponds to an index number of this file.

In these embodiments, the used keys can be of the symmetrical or asymmetrical type. In the case of a symmetrical key, the same key is used for the encryption as well as for the decryption of the data. In the case of an asymmetrical key, the key used to encrypt data is different to the key allowing it to be decrypted. This does not pose any particular problems since the keys for the decryption are either sent from the management centre or known to the decoder. In the present description, in the case of the use of asymmetric keys, the term "the key" in fact represents a pair of keys, one of the keys of the pair being used for the encryption and other key of this pair being used for the decryption.

According to the embodiment illustrated in FIG. 1, two consecutive keys are encrypted by means of a transmission key TK and are sent in the form of a control message ECM to the concerned receivers. These keys are each associated to a different parity, so that at the moment of the decryption, the encryption key identification information PAR allows the determination of which of these two keys must be used.

According to another embodiment, the keys can also be made available to the receivers concerned by other means, for example sent on a physical support independently of the sending of the data packets.

The encrypted data packets are broadcast to the concerned receivers in a conventional way.

Figure 2:
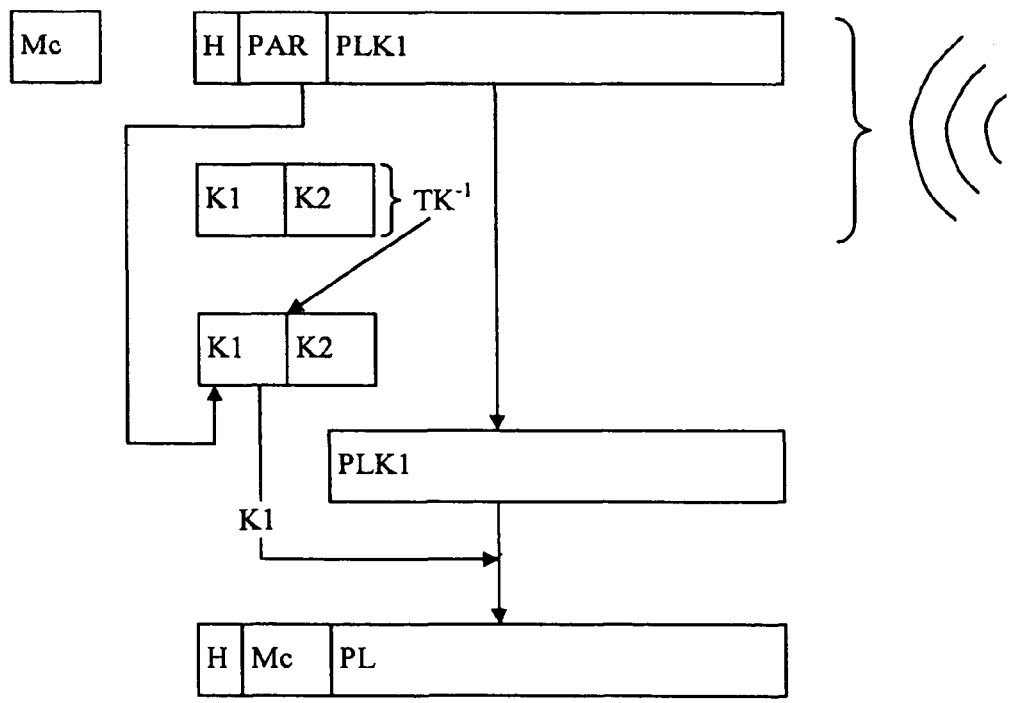
FIG. 2 schematically illustrates the decryption of the data packet in FIG. 1.

FIG. 2 shows the decryption of the data received following the encryption as indicated above.

Let us make the hypothesis that two encryption keys K1 and K2 have been sent in the form of control messages ECM to the receiver. This control message is first processed in order to extract the two encryption keys K1 and K2 by means of the transmission key TK.

Parallel to this, the encrypted data packet is divided into its components, in order to extract the encrypted useful part PLK1.

The identification information PAR originating from the encrypted data packet is also read in order to determine which is the key K1 or K2 that has been used for the encryption of the encrypted useful part PLK1.

When the identity of the encryption key K1 or K2 is known, this key is applied to the encrypted useful part PLK1, in order to obtain the useful part PL in plain text.

The data packet DP is reconstituted by replacing the encryption key identification information PAR with the marker Mc, and by replacing the encrypted useful part PLK1 with the useful part PL in clear. Therefore, a data packet is obtained according to the format given by the receiver. The marker is always identical and has a size and a value recognisable for subsequent processing, the data packet can then be processed conventionally. Since the value of the marker is constant, it can simply be stored in a memory of the decoder.

The invention claimed is:

1. Transmission method for conditional access content, in which said content is broadcast in the form of data packets having a predefined fixed length, said data packets containing at least one marker having a known value and a useful part, this method comprising the following steps:
   deleting said marker from the data packet and introducing an encryption key identification information in said data packet at the place of the deleted marker, said encryption key identification information having a length equal to the length of the marker;
   encryption of said useful part by an encryption key that can be identified by said encryption key identification information, using an encryption device;
   formation of an encrypted data packet containing at least said encryption key identification information and the encrypted useful part;
   transmission of said encrypted data packet to at least one receiver, using a transmission device.

2. Transmission method for a content according to claim 1, wherein said encryption key identification information includes a parity information.

3. Transmission method for a content according to claim 1, wherein said encryption key identification information includes an order number in a key list.

4. Transmission method for a content according to claim 1, wherein said encryption key identification information includes an identification number of the key.

5. Transmission method for a content according to claim 1, wherein at least one key is sent to said receiver in encrypted form in a control message.

6. Transmission method for a content according to claim 1, wherein it includes the following steps:
   reception of the encrypted data packet;
   extraction of said encryption key identification information;
   determinating of a key to be used for the decryption by means of the encryption key identification information;
   decryption of the useful part encrypted by means of said key to be used for the decryption.

7. Transmission method for a content according to claim 6, wherein, prior to the decryption, a data packet is formed by replacing the encryption key identification information with said marker.

8. Method for processing conditional access content, in which said content is broadcast in the form of encrypted data packets having a predefined fixed length, this method comprising the following steps:
   reception, at a receiver, of an encrypted data packet containing an encrypted useful part and at least an encryption key identification information; extraction of said encryption key identification information from said data packet;
   determinating of a key to be used for the decryption of said encrypted useful part, by means of the encryption key identification information independent from encryption key identification information of other data packets;
   decryption by means of the key to be used, of said encrypted useful part, using a decryption device;
   formation of a data packet by replacing, in the encrypted data packet, the encrypted useful part with the useful part and the encryption key identification information with a marker having a known value and a length equal to the length of the encryption key identification information;
   processing of said data packet.

* * * * *

UNITED STATES PATENT AND TRADEMARK OFFICE
CERTIFICATE OF CORRECTION

| | | |
|---|---|---|
| PATENT NO. | : 8,352,732 B2 | Page 1 of 1 |
| APPLICATION NO. | : 11/638515 | |
| DATED | : January 8, 2013 | |
| INVENTOR(S) | : Lelegard | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this
Eleventh Day of November, 2014

Michelle K. Lee
*Deputy Director of the United States Patent and Trademark Office*